United States Patent
Turner et al.

(10) Patent No.: US 10,969,993 B2
(45) Date of Patent: Apr. 6, 2021

(54) METHODS AND APPARATUS FOR RECONFIGURING NODES AND REISSUING DATA ACCESS REQUESTS

(71) Applicant: Arm Limited, Cambridge (GB)

(72) Inventors: Andrew John Turner, Cambridge (GB); Alex James Waugh, Cambridge (GB); Geoffray Lacourba, Sophia Antipolis (FR); Fergus Wilson MacGarry, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/521,723

(22) Filed: Jul. 25, 2019

(65) Prior Publication Data
US 2021/0026554 A1 Jan. 28, 2021

(51) Int. Cl.
*G06F 13/00* (2006.01)
*G06F 3/06* (2006.01)

(52) U.S. Cl.
CPC ............ *G06F 3/0655* (2013.01); *G06F 3/061* (2013.01); *G06F 3/0673* (2013.01)

(58) Field of Classification Search
CPC ....... G06F 3/0655; G06F 3/061; G06F 3/0673
See application file for complete search history.

(56) References Cited

U.S. PATENT DOCUMENTS

| | | | | |
|---|---|---|---|---|
| 2001/0032324 A1* | 10/2001 | Slaughter | .............. | G06F 11/142 714/4.2 |
| 2010/0153676 A1* | 6/2010 | Kawamura | ...... | H03K 19/17728 711/170 |
| 2010/0257335 A1* | 10/2010 | Hanai | ................. | G06F 15/7867 712/15 |
| 2013/0080828 A1* | 3/2013 | Sheffield | ............. | G06F 11/1092 714/6.22 |
| 2014/0176187 A1* | 6/2014 | Jayasena | ............. | G11C 7/1048 326/39 |
| 2015/0341205 A1* | 11/2015 | Invernizzi | ........... | H04L 67/2814 370/219 |
| 2019/0163400 A1* | 5/2019 | Acharya | ............... | G06F 3/0656 |
| 2020/0012443 A1* | 1/2020 | Chen | ...................... | G06F 11/14 |

* cited by examiner

*Primary Examiner* — Jing-Yih Shyu
(74) *Attorney, Agent, or Firm* — Nixon & Vanderhye P.C.

(57) ABSTRACT

An interconnect apparatus comprises first node circuitry for performing first node operations to service data access requests in respect of a first range of memory addresses and second node circuitry for performing second node operations to service data access requests in respect of a second range of memory addresses. The interconnect comprises interface circuitry to: receive a retry indication in respect of a data access request from the first node and forward the retry indication to the requester circuitry; responsive to determining that the interface circuitry has capacity for the data access request, transmit a reissue capacity message to the requester circuitry; receive a reissued data access request from the requester circuitry; and issue the reissued data access request to the second node circuitry. The second node circuitry is responsive to receiving the reissued data access request to service the data access request.

19 Claims, 5 Drawing Sheets

METHODS AND APPARATUS FOR RECONFIGURING NODES AND REISSUING DATA ACCESS REQUESTS

BACKGROUND

The present technique relates to the field of processor interconnects. Such interconnects can be used to provide a connection between devices such as processors, memories, etc. Such devices can be "master" devices which issue requests via the interconnect to be handled by "slave" devices. For example, a master processing device may issue to a storage slave device, via the interconnect, a request for data that is stored in the storage slave device.

Some interconnect devices include node circuitry for performing operations to service data access requests. An example of such a request would be a processor issuing a request for data that is stored in a memory, where both the processor and memory are connected to the interconnect. These operations may for example include serialisation operations required in support of data access requests targeting a memory such as a dynamic random access memory.

Multiple nodes can be included in an interconnect such that, for example, each node performs operations to service data access requests in respect of a different range of memory addresses.

It may be the case that the full bandwidth capacity of the interconnect is not utilised, for example if the rate of servicing data access requests is relatively low compared with a maximum rate, such that the interconnect is operating at a lower bandwidth. In many interconnects, all nodes continue to draw power in such situations.

SUMMARY

At least some examples provide an interconnect apparatus comprising:
first node circuitry for performing first node operations to service data access requests in respect of a first range of memory addresses and second node circuitry for performing second node operations to service data access requests in respect of a second range of memory addresses, the first node operations comprising:
  receiving, from requester circuitry, a data access request in respect of a memory address within the first range; and
  responsive to a node reconfiguration condition being met, issuing a retry indication for the requester circuitry, and interface circuitry to:
  receive the retry indication and forward the retry indication to the requester circuitry;
  responsive to determining that the interface circuitry has capacity for the data access request, transmit a reissue capacity message to the requester circuitry;
  receive a reissued data access request from the requester circuitry; and
  issue the reissued data access request to the second node circuitry, the second node circuitry being responsive to receiving the reissued data access request to service the data access request.

Further examples provide an interconnect apparatus comprising:
first node means for performing first node operations to service data access requests in respect of a first range of memory addresses and second node means for performing second node operations to service data access requests in respect of a second range of memory addresses, the first node operations comprising:
  receiving, from requester means, a data access request in respect of a memory address within the first range; and
  responsive to a node reconfiguration condition being met, issuing a retry indication for the requester means, and interface means to:
  receive the retry indication and forward the retry indication to the requester means;
  responsive to determining that the interface means has capacity for the data access request, transmit a reissue capacity message to the requester means;
  receive a reissued data access request from the requester means; and
  issue the reissued data access request to the second node means, the second node means being responsive to receiving the reissued data access request to service the data access request.

Further examples provide a method comprising:
receiving, at first node circuitry and from requester circuitry, a data access request in respect of a memory address within a first range of memory addresses; and
responsive to a node reconfiguration condition being met, issuing a retry indication for the requester circuitry;
receiving the retry indication at interface circuitry;
forwarding the retry indication from the interface circuitry to the requester circuitry;
responsive to determining that the interface circuitry has capacity for the data access request, transmitting a reissue capacity message from the interface circuitry to the requester circuitry;
receiving, at the interface circuitry, a reissued data access request from the requester circuitry; and
issuing the reissued data access request from the interface circuitry to the second node circuitry, the second node circuitry being responsive to receiving the reissued data access request to service the data access request.

Further aspects, features and advantages of the present technique will be apparent from the following description of examples, which is to be read in conjunction with the accompanying drawings.

DESCRIPTION OF EXAMPLES

Figure 1:
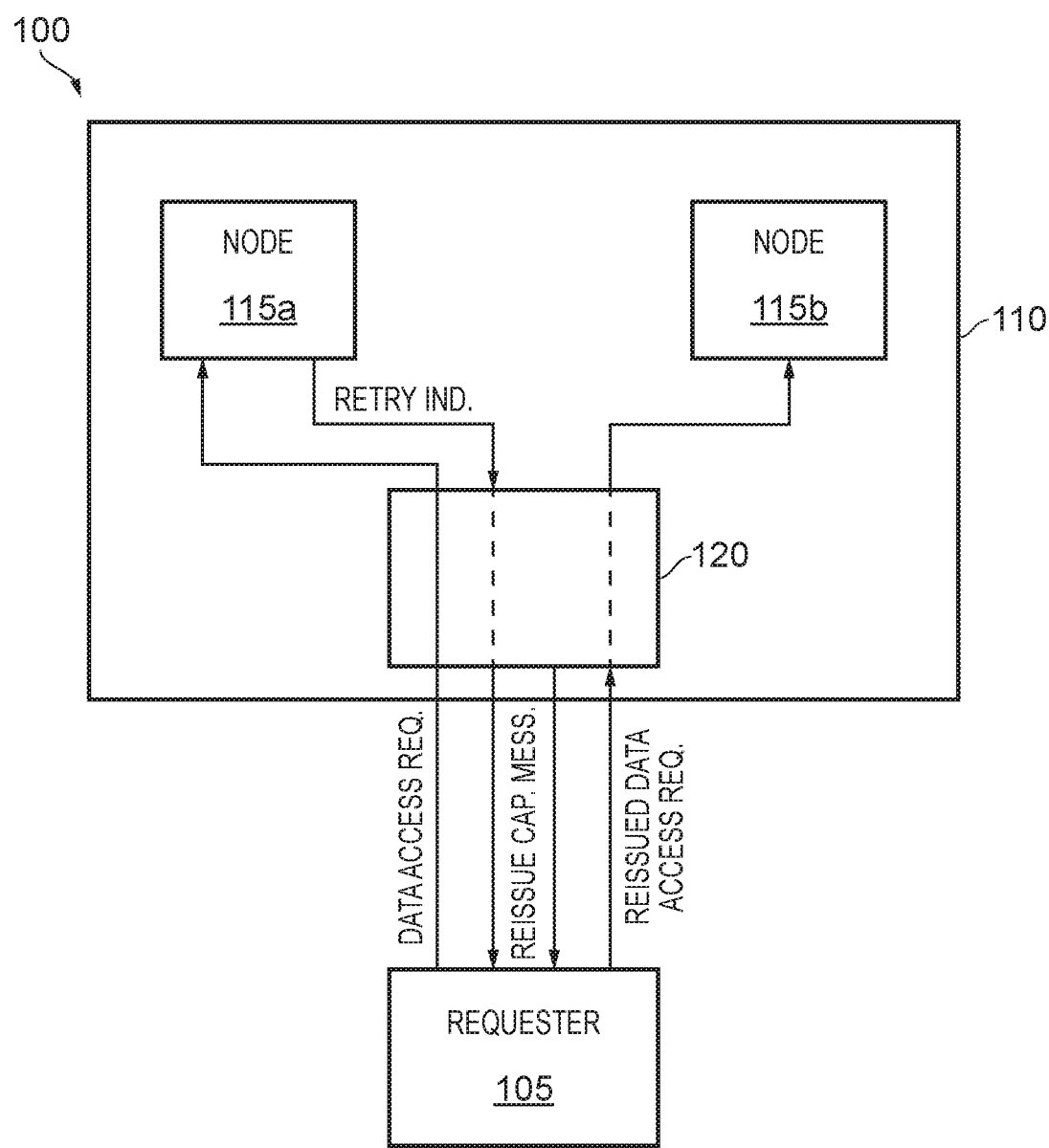
FIG. 1 schematically depicts a processing apparatus according to an example.

As described above, an interconnect can comprise multiple nodes for performing node operations to service data access requests. For example, a processor may issue, via the interconnect, a request for data that is stored in the memory. A node of the interconnect would then perform corresponding node operations to service this request. For example, each node may be responsible for a corresponding range of memory addresses, such that a request is handled by the node that is responsible for the memory address (or addresses) to which the request relates.

In some comparative systems, reconfiguration of the nodes (for example to transition one or more nodes to an inactive low-power state) is not possible. Therefore, even when such a comparative interconnect is not operating at its maximum capacity, each node still draws power.

This lack of ability to reconfigure the nodes may arise from the handling of dependent data accesses, such as dependent load operations which depend on the outcome of another data access. If a node was simply prevented from receiving new data access requests, there would typically be some time before the node could be shut down whilst it finished the handling of data access requests that it had already received. However, if one of these data access requests was dependent on a further data access request that had not yet been received, the further data request would never be received by the node and thus the dependent access request would never be serviced. The node would therefore not "drain" of its outstanding transactions, and thus the node would not be able to be shut down.

Examples of the present disclosure provide an interconnect which can undergo node reconfiguration, for example such that one or more nodes are shut down or transitioned to a low-power inactive state, whilst still allowing dependent instructions to be properly serviced.

One such interconnect apparatus, according to an example of the present disclosure, comprises first node circuitry for performing first node operations to service data access requests in respect of a first range of memory addresses and second node circuitry for performing second node operations to service data access requests in respect of a second range of memory addresses. The interconnect is described in terms of two nodes, but the interconnect could comprise a larger number of nodes, configured to behave in the same manner, in addition to the two that are described here. Each node may for example be serialisation circuitry, such as points of serialisation of the interconnect.

The first node operations comprise receiving, from requester circuitry, a data access request in respect of a memory address within the first range. The requester circuitry may for example be data processing circuitry such as a processor connected to the interconnect.

The first node operations then comprise, responsive to a node reconfiguration condition being met, issuing a retry indication for the requester circuitry. The node reconfiguration condition can indicate that node reconfiguration is to be performed, such that the first node will not service the data access request. For example, the node reconfiguration condition may be that the first node circuitry is to cease performance of first node operations in respect of the first range of memory addresses. This may be because the first node is to be switched to an inactive state such as a low-power state. The retry indication indicates that the data access request should be retried, for example because of a lack of servicing of the data access request by the first node circuitry. Some comparative systems provide for such retry requests to be transmitted to the requester device, which can then retry the data access request at a later time.

The apparatus further comprises interface circuitry. The interface circuitry interfaces between the node circuitry and the requester circuitry. In some examples, multiple requesters are connected to the interconnect and each such requester has associated interface circuitry. The interface circuitry receives the retry indication and forwards the retry indication to the requester circuitry. Responsive to determining that the interface circuitry has capacity for the data access request, the interface circuitry transmits a reissue capacity message to the requester circuitry. The reissue capacity message indicates to the requester circuitry that the interface circuitry has capacity for the data access request, and thus that the data access request can be retried.

The interface circuitry then later receives a reissued data access request, corresponding to a retry of the original data access request, from the requester circuitry.

In the present example, following the node reconfiguration the second node circuitry assumes responsibility for at least part of the first address range, including the address to which the reissued request relates. The interface circuitry accordingly issues the reissued data access request to the second node circuitry, the second node circuitry being responsive to receiving the reissued data access request to service the data access request. This can thus be viewed as the interface circuitry "intercepting" a reissued data access request that is provided from the requester circuitry to the second node circuitry.

The use of the interface in this manner allows the node reconfiguration to occur whilst still correctly servicing the data access request. Conversely, some comparative systems in which no such interface is provided are unable to perform node reconfiguration as this could cause some data access requests to not be serviced. The present system therefore provides an advantage of providing for node reconfiguration, which can reduce overall power usage and increase the efficiency of a processing system (for example where node reconfiguration comprises transitioning at least one node to a low-power state).

Furthermore, the usage of the interface in this manner is transparent to the components external to the interconnect (for example the requester circuitry, and other components such as a memory from which the requested data is to be retrieved): the requester circuitry is not required to be informed of the presence of the interface and can function in the same manner whether or not an interface is provided. Similarly, the usage of the interface is transparent to other components internal to the interconnect (for example the node circuitry). The present interconnect can thus appear (to external components, and to internal components of the interconnect other than the interface circuitry) to function in the same manner as a comparative interconnect that does not implement aspects of the present disclosure, and instead issues retry indications and reissue capacity messages directly without the above-described intermediate interface circuitry. The present interconnect can therefore be used together with components that are configured to operate with an interconnect that does not implement the present disclosure. The interconnect can thus provide the aforementioned advantage in a versatile manner, without requiring reconfiguration of the other components. This approach also scales efficiently as the size of the system is increased, for example in terms of the number of components, compared with comparative systems in which, for example, requesters must dynamically keep track of which node is responsible for the memory address associated with each data access request that awaits reissue.

As mentioned above, the interface circuitry transmits the reissue capacity message responsive to a determination that the interface circuitry has capacity for the data access request. In an example, the interface circuitry comprises a buffer storage and this determination comprises determining that the buffer storage has capacity to store the reissued data access request. The interface circuitry is then responsive to receiving the reissued data access request to store the reissued data access request in the buffer storage. This allows the interface circuitry to store the reissued data access request in the buffer storage until it can be serviced by the second node circuitry, whilst the requester can continue with its processing operations under the assumption that the reissued request will, at some point, be serviced. The requester therefore can proceed without tracking any subsequent retries of the request that are performed by the interface circuitry.

In one such example, the interface circuitry is responsive to receiving an indication that the second node circuitry has serviced the reissued data access request to clear the reissued data access request from the buffer storage and transmit to the requester circuitry an indication that the reissued data access request has been serviced. The interface circuitry can thus buffer the request until it is serviced, and then clear the buffer to provide capacity to receive a further reissued request. The interface circuitry may then be responsive to clearing the data access request from the buffer storage and determining that the requester has a second data access request to be reissued to transmit a second reissue capacity message to the requester circuitry.

In some such examples, the buffer storage has a capacity to store a single data access request, i.e. only one data access request. This minimises the required resources to implement the interface circuitry, whilst still allowing all retried data access requests to be serviced (because once a retried request has been serviced, the buffer is cleared to make space for another retried request).

In an example, the interface circuitry maintains a retry counter to keep track of the number of pending data access requests that are to be reissued. The interface circuitry is responsive to receiving the retry indication to increment the retry counter. The transmitting of the reissue capacity message is conditional on the counter having a non-zero value, such that the message is only sent when there is at least one pending request to be reissued. The interface circuitry is then responsive to transmitting the reissue capacity message to decrement the counter. This provides an efficient way for the interface circuitry to keep track of whether there are any pending requests to be reissued.

In an example, the interface circuitry is responsive to a determination of a lack of servicing of the data access request by the second node circuitry to reissue the data access request to the second node circuitry. This determination may for example be made responsive to receiving an indication from the second node circuitry. The interface circuitry can thus keep reissuing the request to the second node circuitry until it is successfully serviced, without the requester circuitry having to track these reissues. A degree of processing burden is thereby removed from the requester circuitry.

In an example, the interconnect apparatus comprises memory access circuitry communicatively coupled with the first node circuitry and the second node circuitry. The memory access circuitry performs memory access operations serviced by the first node circuitry, and memory access operations serviced by the second node circuitry. For example, these memory access operations may comprise accessing a memory such as a dynamic random access memory (DRAM). Each node can thus use the same memory access circuitry to access the memory from which requested data is ultimately retrieved.

As explained above, devices connected via the interconnect can be considered as "master" and "slave" devices, such that a master device issues data access requests for memory access operations to be performed by a slave device. In an example, the aforementioned memory access circuitry has both master functionality and slave functionality. In the master functionality, the memory access circuitry acts as a master device with respect to a slave device accessed via the interconnect. In other words, the memory access circuitry issues data access requests to the interconnect to be handled by a slave device. An example of such a slave device is second memory access circuitry that controls memory access in respect of a different memory than that associated with the aforementioned memory access circuitry. In the slave functionality, the memory access circuitry acts as a slave device with respect to a master device accessing the memory access circuitry via the interconnect. In other words, the memory access circuitry performs memory access operations based on memory access requests issued to the interconnect from a master device.

The first node circuitry may be responsive to a determination that the memory access operation corresponding to the request is not dependent on a memory access operation that is currently being performed by the memory access circuitry to issue the retry indication. In this example, if the requested memory access operation is dependent on a memory access operation that is currently being performed by the memory access circuitry, the request is serviced by the first node circuitry. Otherwise, the first node circuitry does not service the request, and the retry indication is sent. This allows requests that are dependent on a currently-performed memory access operation to be performed, whilst other requests (for example requests that are dependent on a request that is yet to be received) are not serviced by the first node circuitry and can subsequently be reissued to be serviced by the second node circuitry. This therefore allows the node reconfiguration to be performed (e.g. once the first node circuitry has serviced all requests that do depend on a memory access operation that is currently being performed by the memory access circuitry, and thus has no further requests to service) whilst ensuring that every request can be correctly serviced.

In an example, the second node circuitry is responsive to a second node reconfiguration condition being met to cease performance of memory access operations in respect of the first range of memory addresses. The first node circuitry is responsive to the second node reconfiguration condition being met to resume performance of memory access operations in respect of the first range of memory addresses. Nodes which have ceased servicing memory access requests, for example having been transitioned to a low-power state, can thus be reactivated to resume servicing memory access requests such that the node configuration is returned to its state prior to the node reconfiguration operation (or transitioned to a further, different, state).

Examples of the present disclosure will now be described with reference to the drawings.

FIG. 1 schematically shows a system 100 according to the present disclosure. The system 100 comprises a requester 105 which serves as a master device with respect to a slave device. The requester 105 interacts with the slave device via an interconnect 110. The interconnect 110 comprises nodes 115a, 115b for servicing data access requests received from the requester 105. The slave device, for example memory access circuitry for performing memory access operations in respect of received data access requests, is not shown in FIG. 1.

FIG. 1 illustrates a sequence of transmissions between the requester 105 and the interconnect 110. First, the requester 105 issues a data access request to the first node 115a. This request may go via interface 120 of the interconnect 110. Upon receipt of the data access request, the node 115a determines that it is not to service the data access request, for example because the interconnect 110 is to undergo a node reconfiguration in which the node 115a is transitioned to an inactive state. Next, responsive to this determination, the node 115a transmits a retry indication to the requester 105. The retry indication is transmitted to the requester 105 via the interface 120, which can be viewed as the interface 120 intercepting the retry indication.

At a later time, the interface 120 determines that it has capacity to handle a reissue of the original data access request and transmits a reissue capacity message to the requester 105. Responsive to this, the requester 105 reissues the data access request, thereby transmitting it via the interconnect 110. The interface 120 intercepts the reissued data access request and determines that it should be serviced by the second node 115b. This may for example be because the second node 115b has assumed responsibility for servicing data access requests in respect of memory addresses that were previously handled by the first node 115a. This determination is performed by accessing a system address map which stores data indicating the address range for which each node is responsible. The interface then provides the reissued data access request to the second node 115b for servicing.

Figure 2:
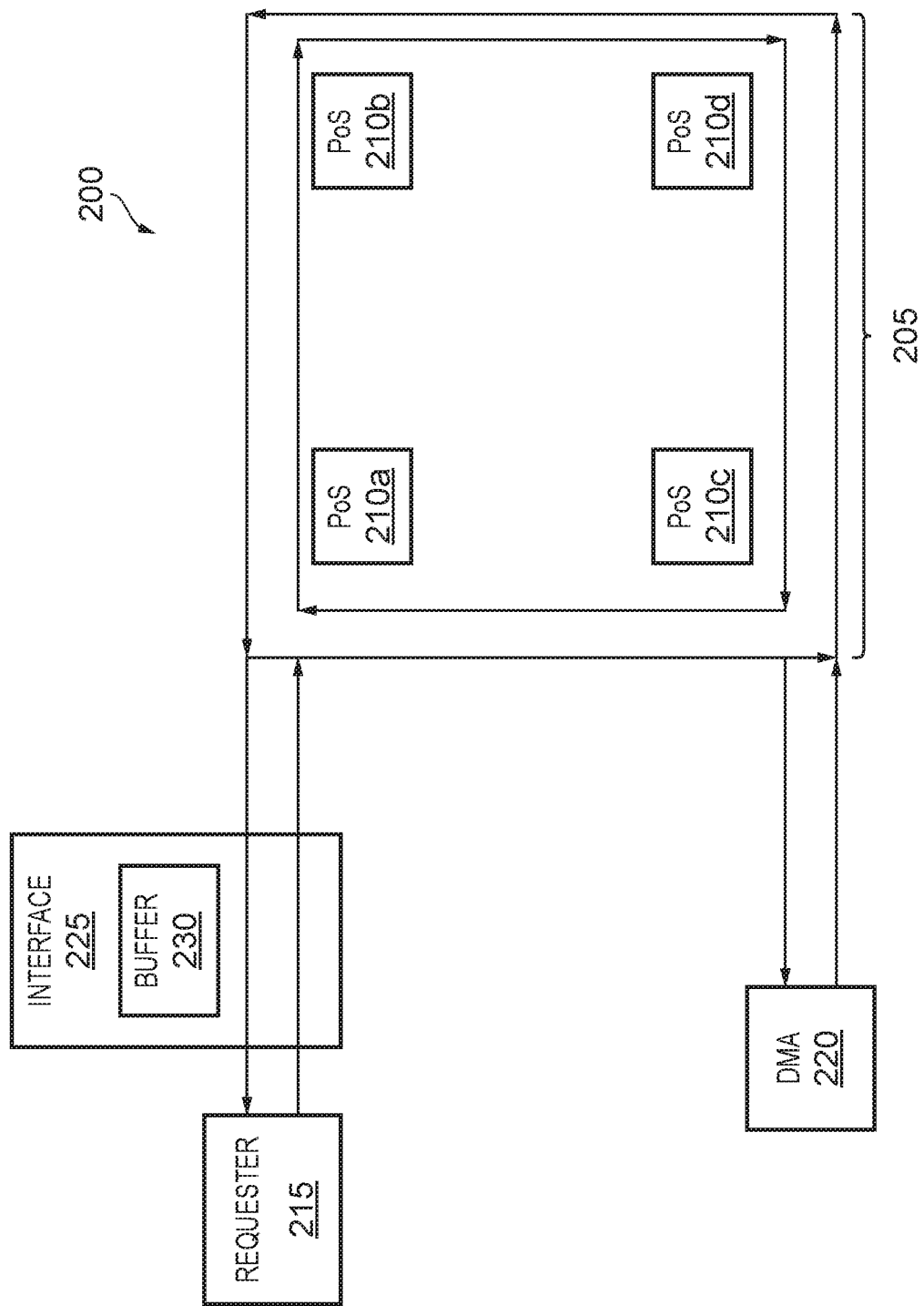
FIG. 2 schematically illustrates a system according to an example.

FIG. 2 schematically illustrates a system 200 according to an example of the present disclosure. The system 200 can be considered as a more detailed version of the system 100 of FIG. 1. Arrows indicate directions of data flow within the system 200.

The system 200 comprises an interconnect 205 having four points of serialisation (PoS) 210a, 210b, 210c, 210d. The points of serialisation correspond to the nodes 115a, 115b of the interconnect 110 of FIG. 1. Each point of serialisation 210a, 210b, 210c, 210d is configured to service data access requests in respect of a corresponding range of memory addresses.

The system 200 comprises a requester 215. The requester 215 may for example be a processor. The requester 215 acts as a master device, issuing data access requests to the interconnect 205.

The system 200 comprises a direct memory access (DMA) unit 220, for performing memory access operations, requested by the requester 215, that are serviced by the points of serialisation 210a, 210b, 210c, 210d. The DMA unit 220 thus acts as a slave device with respect to the requester 215. The DMA unit 220 may also act as a master device with respect to a memory (not shown) which is also coupled to the interconnect 205. When acting as a master device in this manner, the DMA unit 220 issues data access requests to the memory via the interconnect 205.

The system 200 comprises an interface 225. The interface 225 lies between the requester 215 and the points of serialisation 210a, 210b, 210c, 210d. The interface 225 can be considered as part of the interconnect 205.

Figure 3:
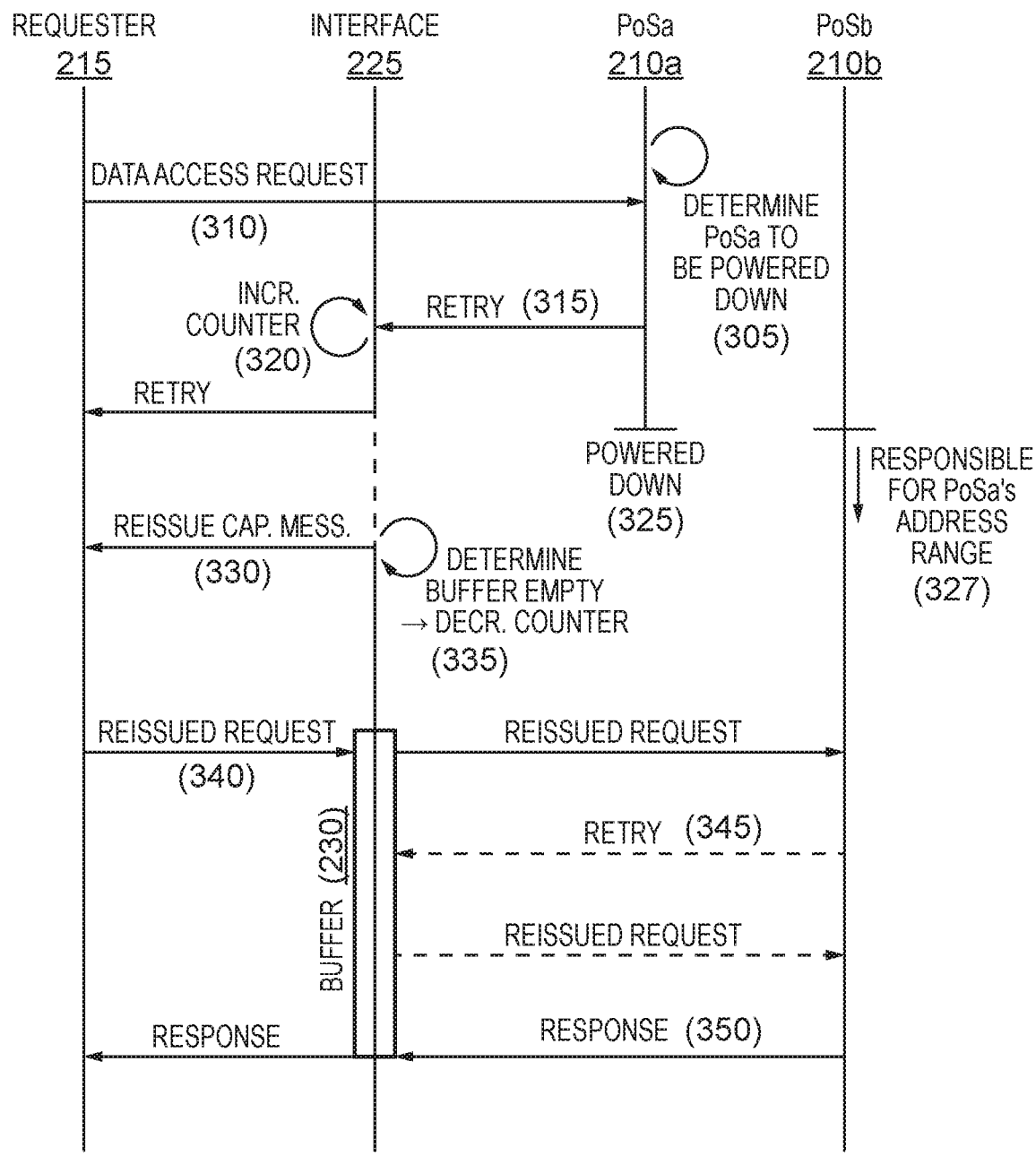
FIG. 3 shows a method for powering down a point of serialisation of the system of FIG. 2.

FIG. 3 shows a method for powering down one of the points of serialisation (PoS) 210a, 210b, 210c, 210d of the system 200 of FIG. 2, whilst still ensuring that each data access request issued by the requester 215 is properly serviced. The method is illustrated in terms of the interaction between the requester 215, interface 225, and two points of serialisation PoSa 210a and PoSb 210b.

At 305, it is determined that PoSa 210a is to be powered down and that PoSb 210b will become responsible for servicing data access requests in respect of the memory address range that is currently handled by PoSa 210a.

It may be the case that, following the determination 305 and prior to the powering down of PoSa 210a, the requester 215 issues a data access request 310 in respect of a memory address within the range handled by PoSa 210a. In such a situation, at the time of the request 310 being issued, PoSa 210a is still responsible for servicing requests in respect of this address range. The request 310 is therefore received at PoSa 210a.

However, because PoSa 210a is to be powered down, it determines that it is not to service the request 310. PoSa 210a therefore transmits a retry indication 315 to the requester 215. The interface 225 intercepts the retry indication 315.

Responsive to intercepting the retry indication 315, at 320 the interface 225 increments a retry counter. The retry counter tracks the number of outstanding data access requests that are to be reissued. It has an initial value of zero, when there are no outstanding data access requests to be reissued. The interface 225 then forwards the retry indication to the requester 215.

Subsequently, PoSa 210a is powered down at 325 and PoSb 210b assumes responsibility at 327 for servicing data access requests in respect of the memory address range that was previously handled by PoSa 210a.

At a later time, the interface 225 determines that its buffer 230 is empty and thus that it has capacity to handle a reissued data access request. Following this determination, the interface 225 transmits a reissue capacity message 330 to the requester 215 to indicate that the requester 215 can reissue the data access request 310. The reissue capacity message may for example be a protocol credit message such as that associated with the Arm® AMBA® 5 CHI (Coherent Hub Interface) specification. The interface 225 also decrements the retry counter at 335 in anticipation of receiving the reissued data access request, so that the retry counter maintains an accurate count of the number of data access requests awaiting reissue.

The requester 215 responds to receiving the reissue capacity message 330 by reissuing the data access request 310 as a reissued request 340.

The interface 225 receives the reissued request 340 and stores the reissued request 340 in the buffer 230. The interface 225 then forwards the reissued request 340 to PoSb 210b, which is now responsible for servicing data access requests in respect of the memory address to which the request relates.

PoSb 210b may be unable to service the reissued request 340 at the time it is received. If so, PoSb 210b transmits a retry message 345 towards the requester 215. The interface 225 intercepts the retry message 345 and does not forward it to the requester 215, but instead resubmits the reissued request to PoSb 210b at a suitable later time. This process of retrying the resubmitted request is therefore invisible to the requester 215: once it has reissued the data access request, the requester 215 can proceed on the assumption that it will, at some point, be serviced. This approach therefore avoids the additional processing and signalling overheads that would be incurred if requester 215 were to keep track of the retrying of the reissued request 340. Forward progress of servicing data access requests can still be ensured by, for example, requiring at least one operation be performed in respect of each PoS before allowing the next PoS reconfiguration to occur.

After the reissued request 340 has been successfully serviced by PoSb 210b, PoSb 210b transmits a response message 350 to the requester 215. The response message 350 indicates that the reissued request 340 has been serviced, and may for example include a return value such as the requested data.

The interface 225 intercepts the response message 350 and, in response to this, the interface 225 clears the buffer 230 and forwards the response to the requester 215. The buffer 230 being clear, if the retry counter has a non-zero value then the interface 225 can submit a further reissue capacity message to indicate that it has capacity for a further data access request to be reissued.

Figure 4:
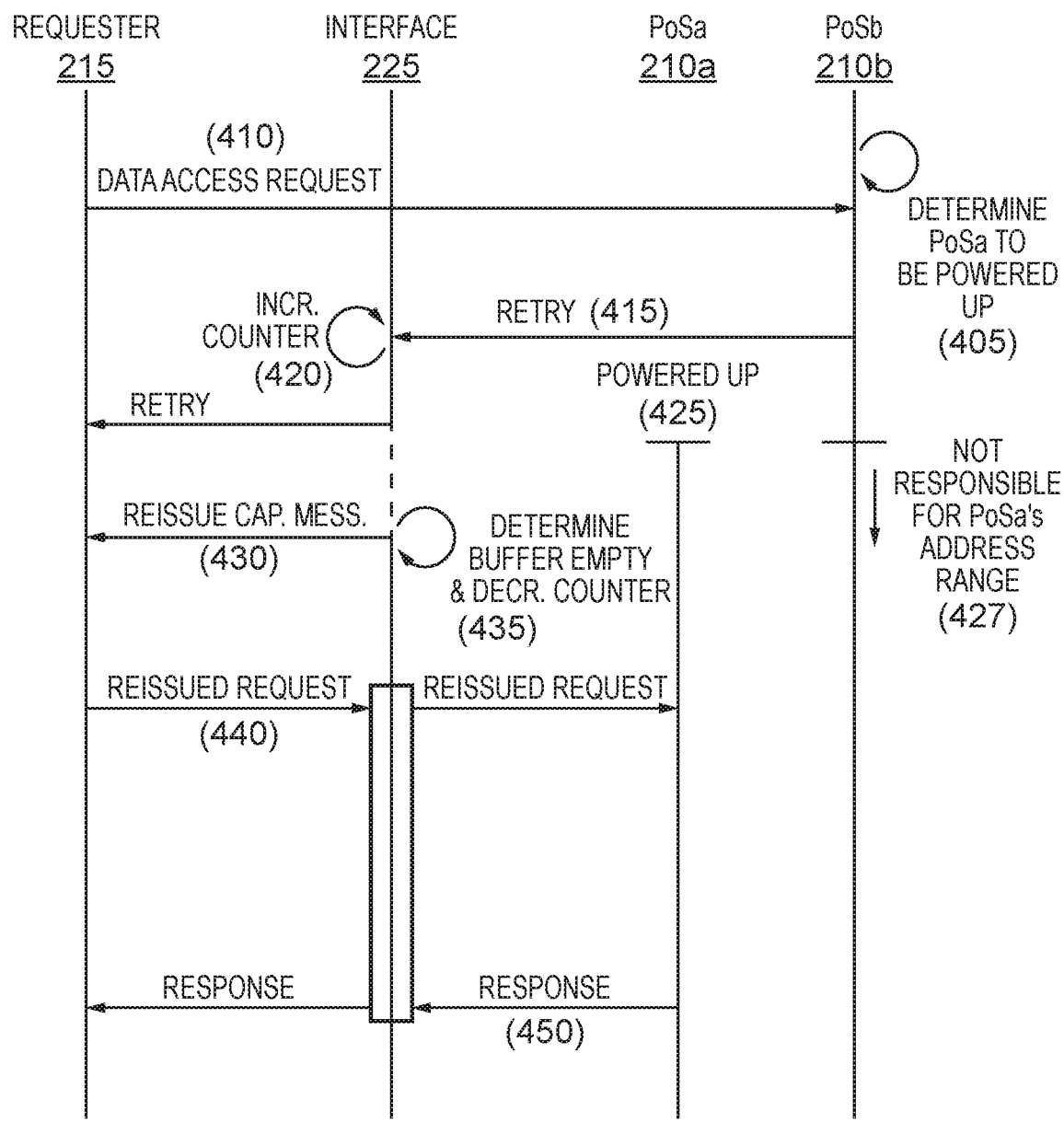
FIG. 4 shows a method for powering up a point of serialisation of the system of FIG. 2.

FIG. 4 shows a method for powering up one of the points of serialisation (PoS) 210a, 210b, 210c, 210d of the system 200 of FIG. 2 at a time after it has been powered down as described with reference to FIG. 3, whilst still ensuring that each data access request issued by the requester 215 is properly serviced. As for FIG. 3, the method is illustrated in terms of the interaction between the requester 215, interface 225, and two points of serialisation PoSa 210a and PoSb 210b. Specifically, the method provides for PoSa 210a to be powered back up after having been powered down by way of the method of FIG. 3. The method can, in some ways, be seen as an inverse of the method of FIG. 3.

Initially, the system is in the state of the end of the method of FIG. 3: PoSa 210a is powered down and PoSb 210b is responsible for servicing data access requests in respect of the memory address range that was originally handled by PoSa 210a.

At 405 it is determined that PoSa 210a is to be powered up and will regain responsibility for servicing data access requests in respect of the range of memory addresses that it originally handled. PoSb 210b is therefore to cease responsibility for this range of memory addresses.

It may be the case that, following the determination 405 and prior to the powering up for PoSa 210a, the requester 215 issues a data access request 410 in respect of a memory address within the range that was originally handled by PoSa 210a. In such a situation, at the time of the request 410 being issued, this address range is handled by PoSb 210b. The request 410 is accordingly provided to PoSb 210b.

Because PoSb 210b is to cease responsibility for servicing data access requests in respect of the memory address to which the request 410 relates, it determines that it is not to service the request. PoSb 210b therefore transmits a retry indication 415 to the requester 215.

The interface 225 intercepts the retry indication 415 and, responsive to this, at 420 the interface 225 increments the retry counter to indicate that the request 410 is to be retried. The interface 225 then forwards the retry indication to the requester 215.

Subsequently, PoSa 210a is powered up at 425 and PoSb ceases responsibility at 427 for servicing data access requests in respect of the memory address range that was originally handled by PoSa 210a and is now to be handled again by PoSa 210a.

At a later time, the interface 225 determines that its buffer 230 is empty and thus that it has capacity to handle a reissued data access request. Following this determination, the interface 225 transmits a reissue capacity message 430 to the requester 215 to indicate that the requester 215 can reissue the data access request 410. The interface 225 also decrements the retry counter at 435 in anticipation of receiving the reissued data access request.

The requester 215 responds to receiving the reissue capacity message 430 by reissuing the data access request 410 as a reissued request 440.

The interface 225 receives the reissued request 440 and stores the reissued request 440 in the buffer 230. The interface 225 then forwards the reissued request 440 to PoSa 210a, which is now responsible for servicing data access requests in respect of the memory address to which the request relates.

If PoSa 210a is unable to service the reissued request 440, it may transmit a retry message which is handled in the same manner as the retry message 345 of FIG. 3. For conciseness, this is not shown here.

After the reissued request 440 has been successfully serviced by PoSb 210b, PoSa 210a transmits a response message 450 to the requester 215. The response message 450 indicates that the reissued request 440 has been serviced, and may for example include a return value such as the requested data.

The interface 225 intercepts the response message 450 and, in response to this, the interface 225 clears the buffer 230 and forwards the response to the requester 215. The buffer 230 being clear, if the retry counter has a non-zero value then the interface 225 can submit a further reissue capacity message to indicate that it has capacity for a further data access request to be reissued.

As can be seen from the FIGS. 3 and 4, the same general technique can be used to allow PoS reconfiguration including both powering down of PoSs and powering up of PoSs. This technique can be expanded to more complicated reconfiguration, for example where multiple nodes are simultaneously powered down or powered up, or where some nodes are powered down and others are simultaneously powered up. The present technique allows these reconfiguration operations to be performed whilst ensuring that each data access request that is issued by a requester 215 will, at some point, be correctly serviced.

Figure 5:
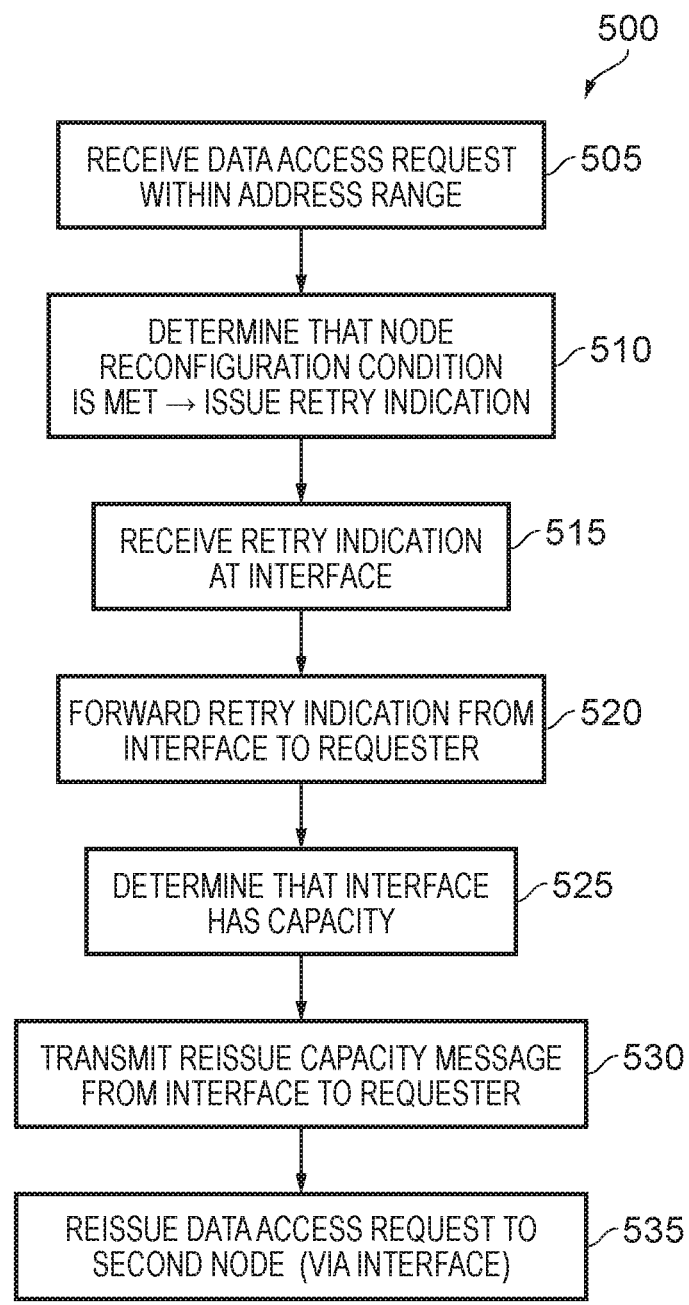
FIG. 5 shows a method according to an example.

FIG. 5 depicts a method 500 according to examples of the present disclosure. The method can be implemented by an interconnect as described elsewhere herein.

At block 505, a data access request is received within an address range associated with a first node of the interconnect.

At block 510, it is determined that a node reconfiguration condition is met. For example, the node reconfiguration condition may be that the interconnect is operating with a low rate of data access requests is being received and thus that the first node is to be powered down to save power. Responsive to this determination, a retry indication is issued for the requester circuitry.

At block 515, the retry indication is received at interface circuitry.

At block 520, the interface circuitry forwards the retry indication to the requester circuitry.

At block 525, it is determined that the interface has capacity for the data access request to be reissued.

At block 530, a reissue capacity message is transmitted from the interface to the requester to indicate that the interface has capacity for the data access request to be reissued.

At block 535, the data access request is reissued to a second node of the interconnect. The reissuing is performed by way of the requester circuitry reissuing the data access request to the interface, following which the interface forwards the reissued request to the second node.

Apparatuses and methods are thus provided for dynamic node configuration within an interconnect.

From the above description it will be seen that the techniques described herein provides a number of significant benefits. In particular, nodes can be dynamically reconfigured, for example by powering nodes up and down based on bandwidth requirements, whilst still ensuring that all issued data access requests are correctly serviced.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An interconnect apparatus comprising:
   first node circuitry for performing first node operations to service data access requests in respect of a first range of memory addresses and second node circuitry for performing second node operations to service data access requests in respect of a second range of memory addresses, the first node operations comprising:
      receiving, from requester circuitry, a data access request in respect of a memory address within the first range; and
      responsive to a node reconfiguration condition being met, issuing a retry indication for the requester circuitry, and
   interface circuitry to:
      receive the retry indication and forward the retry indication to the requester circuitry;
      responsive to determining that the interface circuitry has capacity for the data access request, transmit a reissue capacity message to the requester circuitry;
      receive a reissued data access request from the requester circuitry; and
      issue the reissued data access request to the second node circuitry, the second node circuitry being responsive to receiving the reissued data access request to service the data access request.

2. The interconnect apparatus of claim 1, wherein:
   the interface circuitry comprises a buffer storage;
   the determining that the interface circuitry has capacity for the data access request comprises determining that the buffer storage has capacity to store the reissued data access request; and
   the interface circuitry is responsive to receiving the reissued data access request to store the reissued data access request in the buffer storage.

3. The interconnect apparatus of claim 2, wherein the interface circuitry is responsive to receiving an indication that the second node circuitry has serviced the reissued data access request to clear the reissued data access request from the buffer storage and transmit to the requester circuitry an indication that the reissued data access request has been serviced.

4. The interconnect apparatus of claim 3, wherein the interface circuitry is responsive to clearing the reissued data access request from the buffer storage and determining that the requester circuitry has a second data access request to be reissued to transmit a second reissue capacity message to the requester circuitry.

5. The interconnect apparatus of claim 2, wherein the buffer storage has a capacity to store a single data access request.

6. The interconnect apparatus of claim 1, wherein the interface circuitry is:
   responsive to receiving the retry indication to increment a retry counter, wherein the transmitting of the reissue capacity message is conditional on the retry counter having a non-zero value; and
   responsive to transmitting the reissue capacity message to decrement the retry counter.

7. The interconnect apparatus of claim 1, wherein the node reconfiguration condition is that the first node circuitry is to cease performance of first node operations in respect of the first range of memory addresses.

8. The interconnect apparatus of claim 7, wherein the node reconfiguration condition is that the first node circuitry is to be switched to a low-power state.

9. The interconnect apparatus of claim 8, wherein the low-power state is an inactive state.

10. The interconnect apparatus of claim 1, wherein the interface circuitry is responsive to a determination of a lack of servicing of the data access request by the second node circuitry to reissue the data access request to the second node circuitry.

11. The interconnect apparatus of claim 1, comprising memory access circuitry communicatively coupled with the first node circuitry and the second node circuitry for:
   performance of memory access operations serviced by the first node circuitry; and
   performance of memory access operations serviced by the second node circuitry.

12. The interconnect apparatus of claim 11, wherein the memory access circuitry has:
   master functionality in which the memory access circuitry acts as a master device with respect to a slave device accessed via the interconnect; and
   slave functionality in which the memory access circuitry acts as a slave device with respect to a master device accessing the memory access circuitry via the interconnect.

13. The interconnect apparatus of claim 11, wherein the first node circuitry is responsive to a determination that the memory access operation is not dependent on a memory access operation that is currently being performed by the memory access circuitry to issue the retry indication.

14. The interconnect apparatus of claim 1, wherein:
   the second node circuitry is responsive to a second node reconfiguration condition being met to cease performance of memory access operations in respect of the first range of memory addresses; and
   the first node circuitry is responsive to the second node reconfiguration condition being met to resume performance of memory access operations in respect of the first range of memory addresses.

15. The interconnect apparatus of claim 1, wherein the retry indication indicates a lack of servicing of the data access request by the first node circuitry.

16. The interconnect apparatus of claim 1, wherein the first node circuitry is first serialisation circuitry and the second node circuitry is second serialisation circuitry.

17. The interconnect apparatus of claim 1, wherein the requester circuitry is data processing circuitry.

18. An interconnect apparatus comprising:

first node means for performing first node operations to service data access requests in respect of a first range of memory addresses and second node means for performing second node operations to service data access requests in respect of a second range of memory addresses, the first node operations comprising:
- receiving, from requester means, a data access request in respect of a memory address within the first range; and
- responsive to a node reconfiguration condition being met, issuing a retry indication for the requester means, and interface means to:
- receive the retry indication and forward the retry indication to the requester means;
- responsive to determining that the interface means has capacity for the data access request, transmit a reissue capacity message to the requester means;
- receive a reissued data access request from the requester means; and
- issue the reissued data access request to the second node means, the second node means being responsive to receiving the reissued data access request to service the data access request.

19. A method comprising:

receiving, at first node circuitry and from requester circuitry, a data access request in respect of a memory address within a first range of memory addresses; and responsive to a node reconfiguration condition being met, issuing a retry indication for the requester circuitry;

receiving the retry indication at interface circuitry;

forwarding the retry indication from the interface circuitry to the requester circuitry;

responsive to determining that the interface circuitry has capacity for the data access request, transmitting a reissue capacity message from the interface circuitry to the requester circuitry;

receiving, at the interface circuitry, a reissued data access request from the requester circuitry; and issuing the reissued data access request from the interface circuitry to the second node circuitry, the second node circuitry being responsive to receiving the reissued data access request to service the data access request.

* * * * *